United States Patent
Luedecke et al.

(10) Patent No.: US 10,045,587 B2
(45) Date of Patent: Aug. 14, 2018

(54) FOOTWEAR INCLUDING LIGHTWEIGHT OUTSOLE STRUCTURE AND METHOD OF FORMING OUTSOLE STRUCTURE

(71) Applicant: Under Armour, Inc., Baltimore, MD (US)

(72) Inventors: Tom Luedecke, Portland, OR (US); Patrick Cassiday, Portland, OR (US)

(73) Assignee: UNDER ARMOUR, INC., Baltimore, MD (US)

( * ) Notice: Subject to any disclaimer, the term of this patent is extended or adjusted under 35 U.S.C. 154(b) by 0 days.

(21) Appl. No.: 15/171,703

(22) Filed: Jun. 2, 2016

(65) Prior Publication Data
US 2016/0353834 A1 Dec. 8, 2016

Related U.S. Application Data

(60) Provisional application No. 62/169,924, filed on Jun. 2, 2015.

(51) Int. Cl.
| | |
|---|---|
| *A43B 13/12* | (2006.01) |
| *A43B 13/04* | (2006.01) |
| *B29D 35/12* | (2010.01) |
| *A43B 13/02* | (2006.01) |
| *A43B 13/14* | (2006.01) |
| *A43B 13/18* | (2006.01) |

(52) U.S. Cl.
CPC ......... *A43B 13/122* (2013.01); *A43B 13/026* (2013.01); *A43B 13/04* (2013.01); *A43B 13/12* (2013.01); *A43B 13/127* (2013.01); *A43B 13/141* (2013.01); *A43B 13/181* (2013.01); *B29D 35/122* (2013.01)

(58) Field of Classification Search
CPC ..... A43B 13/12; A43B 13/122; A43B 13/125; A43B 13/127; A43B 13/04
USPC .......................................... 36/31, 30 R, 25 R
See application file for complete search history.

(56) References Cited

U.S. PATENT DOCUMENTS

| | | | | |
|---|---|---|---|---|
| 1,382,768 A | * | 6/1921 | Ferguson ............... | A43B 13/12 36/17 R |
| 1,704,187 A | * | 3/1929 | Glidden ................. | A43B 13/10 36/30 R |
| 2,333,303 A | | 11/1943 | Enos | |
| 2,365,964 A | * | 12/1944 | Levine .................... | A43B 1/02 36/19.5 |
| 2,962,736 A | * | 12/1960 | Marasco ................ | A43D 25/10 12/38 |

(Continued)

OTHER PUBLICATIONS

International Search Report and Written Opinion for PCT/US2016/035481, dated Oct. 20, 2016, 6 pages.

(Continued)

*Primary Examiner* — Jila M Mohandesi
(74) *Attorney, Agent, or Firm* — Edell, Shapiro & Finnan, LLC (57) ABSTRACT

An article of footwear includes an outsole structure, where the outsole structure includes a plurality of layers with at least two rubber layers and at least one textile layer disposed between the two rubber layers. The outsole structure can further include a base structure including the plurality of layers and a plurality of ground engaging structures coupled with and extending from a surface of an exposed rubber layer of the base structure.

20 Claims, 7 Drawing Sheets

(56) References Cited

U.S. PATENT DOCUMENTS

| | | | | |
|---|---|---|---|---|
| 2,962,738 A * | 12/1960 | Andrade | ............... | B29D 35/10 |
| | | | | 12/142 E |
| 4,561,195 A * | 12/1985 | Onoda | ................... | A43B 5/00 |
| | | | | 36/28 |
| 4,615,126 A | 10/1986 | Mathews | | |
| 4,854,057 A | 8/1989 | Misevich et al. | | |
| 5,285,583 A * | 2/1994 | Aleven | ................. | A43B 13/38 |
| | | | | 36/43 |
| 6,032,388 A | 3/2000 | Fram | | |
| 6,295,741 B1 | 10/2001 | Kita | | |
| 6,775,930 B2 | 8/2004 | Fuerst | | |
| 6,782,642 B2 | 8/2004 | Knoche et al. | | |
| 6,807,752 B2 | 10/2004 | Nakano et al. | | |
| 7,081,221 B2 | 7/2006 | Paratore et al. | | |
| 7,168,187 B2 | 1/2007 | Robbins | | |
| 7,203,985 B2 * | 4/2007 | Cox | ..................... | A43B 1/0027 |
| | | | | 12/146 B |
| 7,313,879 B2 * | 1/2008 | Ward | ........................ | G09F 3/20 |
| | | | | 206/227 |
| 7,401,421 B2 * | 7/2008 | Brennan | ............. | A43B 13/026 |
| | | | | 36/107 |
| 7,883,658 B2 | 2/2011 | Baier et al. | | |
| 8,029,715 B2 | 10/2011 | Fogg et al. | | |
| 8,112,909 B2 | 2/2012 | Kubo et al. | | |
| 8,338,697 B2 | 12/2012 | Hoya et al. | | |
| 8,460,593 B2 | 6/2013 | Fogg et al. | | |
| 2003/0121179 A1 * | 7/2003 | Chen | ..................... | A43B 13/04 |
| | | | | 36/30 R |
| 2004/0221485 A1 * | 11/2004 | Pfander | ................ | A43B 1/0009 |
| | | | | 36/30 R |
| 2005/0126036 A1 * | 6/2005 | Wu | ......................... | A43B 7/08 |
| | | | | 36/3 B |
| 2005/0172513 A1 * | 8/2005 | Lechhart | .................. | A43B 7/08 |
| | | | | 36/3 B |
| 2008/0216357 A1 | 9/2008 | Fogg et al. | | |
| 2008/0263905 A1 | 10/2008 | Tai | | |
| 2009/0019727 A1 * | 1/2009 | Fenzi | ....................... | A43B 7/32 |
| | | | | 36/44 |
| 2009/0044432 A1 | 2/2009 | O'Connor et al. | | |
| 2009/0133288 A1 * | 5/2009 | Gallegos | .................. | A43B 3/24 |
| | | | | 36/91 |
| 2009/0172971 A1 * | 7/2009 | Peikert | ................... | A43B 7/125 |
| | | | | 36/88 |
| 2011/0167680 A1 | 7/2011 | Law | | |
| 2011/0219643 A1 | 9/2011 | Tai | | |
| 2012/0297641 A1 * | 11/2012 | Pfister | .................... | A43B 7/223 |
| | | | | 36/43 |

OTHER PUBLICATIONS

Mizuno Wave Sayonara 2 Review. Datasheet (online), https://www.solereview.com/mizuno-wave-sayonara-2-review, retrieved by PCT Examiner on Sep. 30, 2016, 22 pages.

* cited by examiner

FIG. 5

FOOTWEAR INCLUDING LIGHTWEIGHT OUTSOLE STRUCTURE AND METHOD OF FORMING OUTSOLE STRUCTURE

CROSS-REFERENCE TO RELATED APPLICATION

This application claims priority from U.S. Provisional Patent Application Ser. No. 62/169,924, entitled "Footwear Including Lightweight Sole Structure Providing Enhanced Comfort, Flexibility and Performance Features", filed Jun. 2, 2015, the disclosure of which is incorporated herein by reference in its entirety.

FIELD OF THE INVENTION

The present invention relates to an article of footwear and, in particular, footwear including a sole structure that is lightweight while providing user comfort and durability.

BACKGROUND

Articles of footwear (also referred to herein as shoes) typically include an upper and a sole structure attached to the upper. For example, athletic footwear typically includes an upper secured (e.g., via adhesive and/or stitching) to a midsole that provides some level of cushioning to a user depending upon a particular use. An outsole is also typically provided to engage the surface upon which the user is walking or running, where the outsole is designed to withstand some degree of wear during use. Due to the location and purpose of the outsole (i.e., most or all of the outsole elements are constantly engaging a support surface upon which the footwear is used), the outsole is typically constructed of a material that is harder and exhibits a greater degree of wear and abrasion resistance than the midsole.

A shoe is typically no longer functional or useful when the outsole is so worn that it fails to provide adequate comfort or operability for the sole structure. Accordingly, outsoles are typically formed entirely of rubber and have a sufficient thickness on the order of about at least about 1.5 mm, and often at least about 2 mm, to ensure the durability and longevity of a shoe. However, providing a thicker outsole to enhance longevity can increase the weight of the shoe to such an extent that it negatively impacts performance and user comfort and feel for the shoe.

Accordingly, it would be desirable to provide an article of footwear (e.g., for running and/or other athletic activities) including a sole structure with an outsole that is suitably lightweight without sacrificing endurance and longevity of the outsole.

SUMMARY OF THE INVENTION

An article of footwear comprises an outsole structure, where the outsole structure comprises a plurality of layers including at least two rubber layers and at least one textile layer disposed between the two rubber layers.

In example embodiments, the outsole structure for the article of footwear can comprise a first layer comprising a rubber material, a second layer comprising a textile material, and a third layer comprising a rubber material, where the second layer is disposed between the first and third layers.

In further example embodiments, the outsole structure for the article of footwear comprises a base structure including the plurality of layers and a plurality of ground engaging structures coupled with and extending from a surface of an exposed rubber layer of the base structure.

The outsole structure can be combined with a midsole structure and an upper to form the article of footwear. For example, an article of footwear can comprise an upper and a sole structure, where the sole structure includes the outsole structure as described herein. The sole structure can further comprise a midsole structure including a layer that is coupled with the base structure at a surface that opposes the base structure surface that is coupled with the ground engaging structures.

A method of forming the outsole structure can comprise pressing a first surface of the second layer against the third layer in a mold that secures the first and third layers together, where the second layer includes a second surface that opposes the first surface of the second layer. The first layer is pressed in a mold to form ground engaging structures extending from a first surface of the first layer, where the first layer includes a second surface that opposes the first surface of the first layer. The second and third layers secured together are placed against the first layer such that a second surface of the second layer is adjacent a second surface of the first layer, and the first, second and third layers are pressed together in a mold to secure the second layer to the first layer.

The above and still further features and advantages of the present invention will become apparent upon consideration of the following detailed description of specific embodiments thereof.

BRIEF DESCRIPTION OF THE DRAWINGS

Like reference numerals have been used to identify like elements throughout this disclosure.

DETAILED DESCRIPTION

Figure 1A:
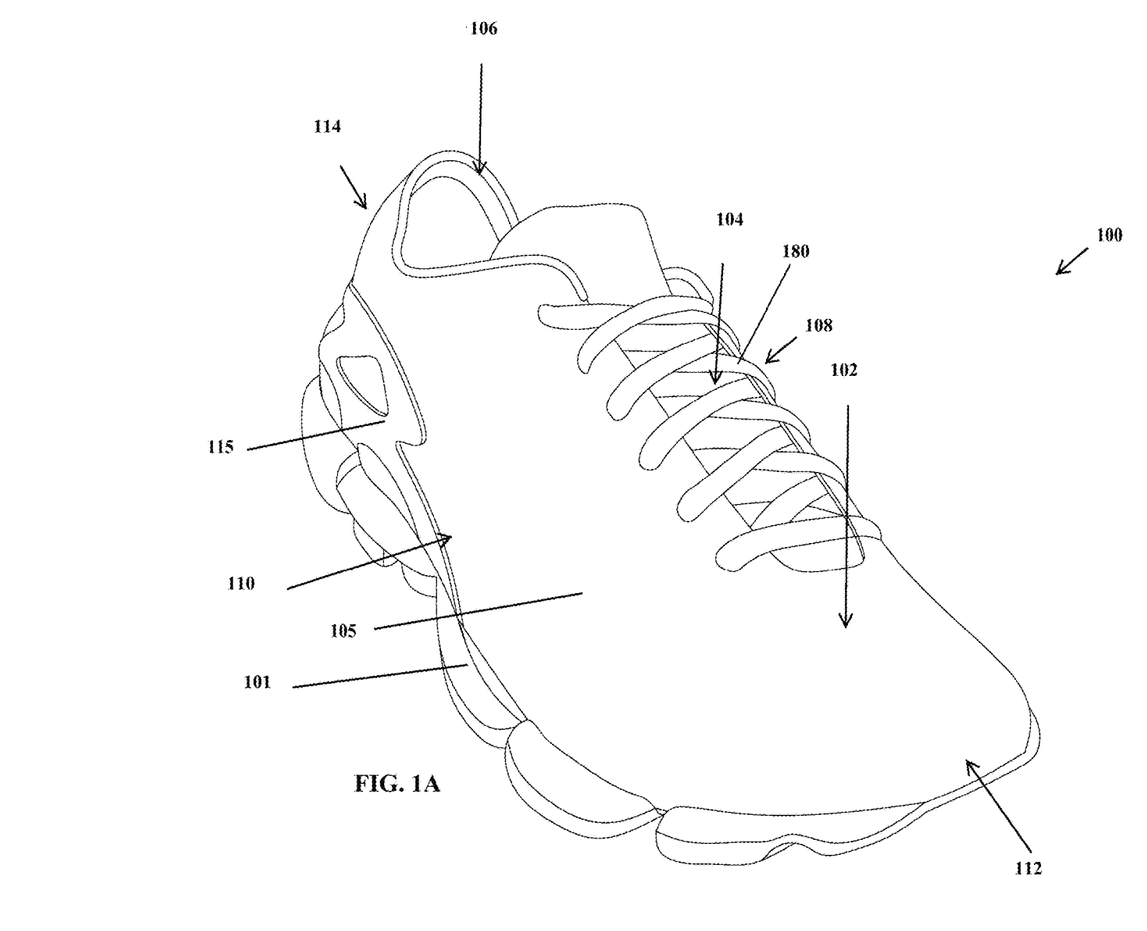
FIG. 1A is side view in perspective of an example embodiment of an article of footwear (footwear configured for a right foot) implementing a sole structure including a lightweight outsole structure in accordance with the present invention, showing the lateral footwear side.
Figure 1B:
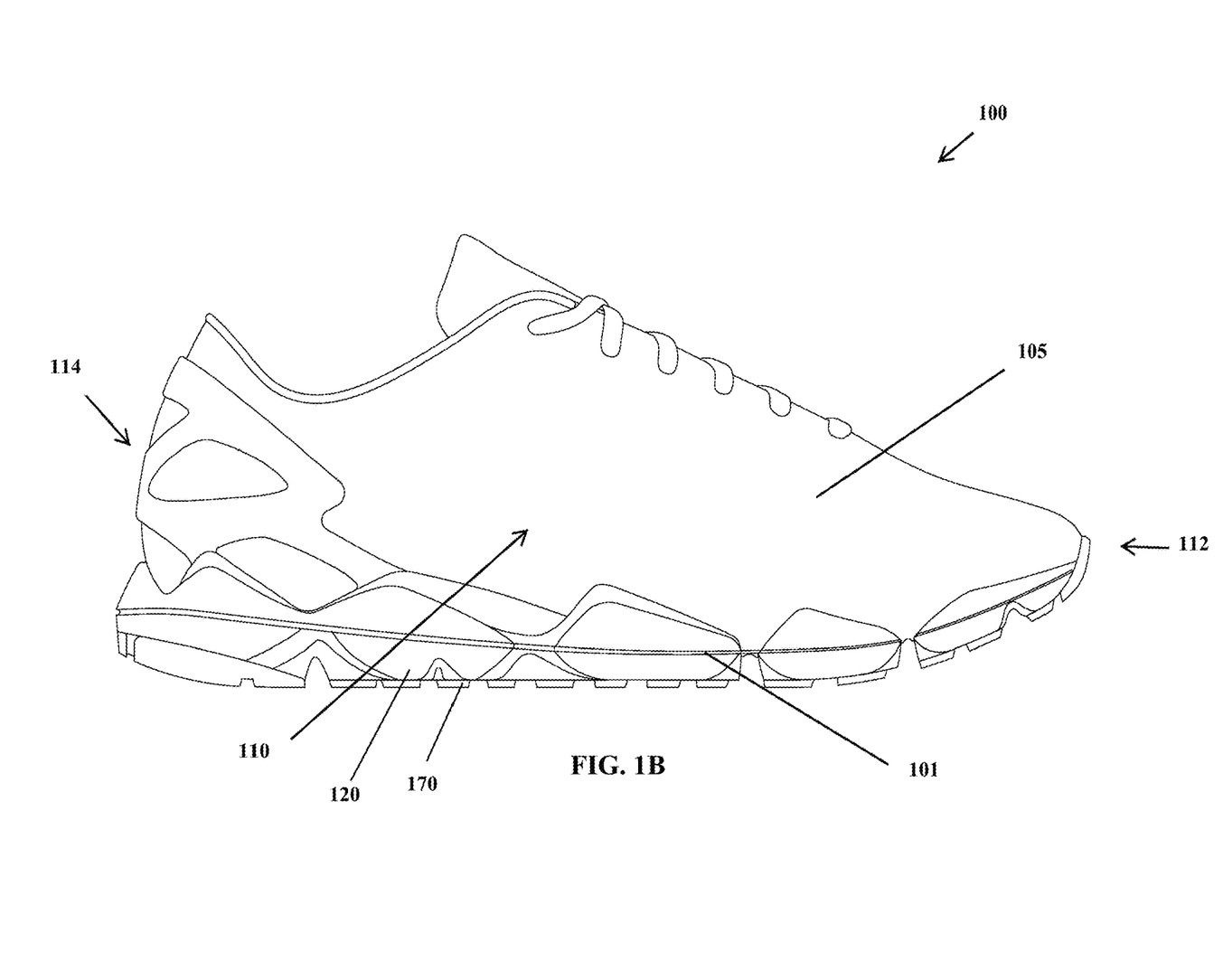
FIG. 1B is a side view in elevation of the article of footwear shown in FIG. 1A, showing the lateral footwear side.
Figure 1C:
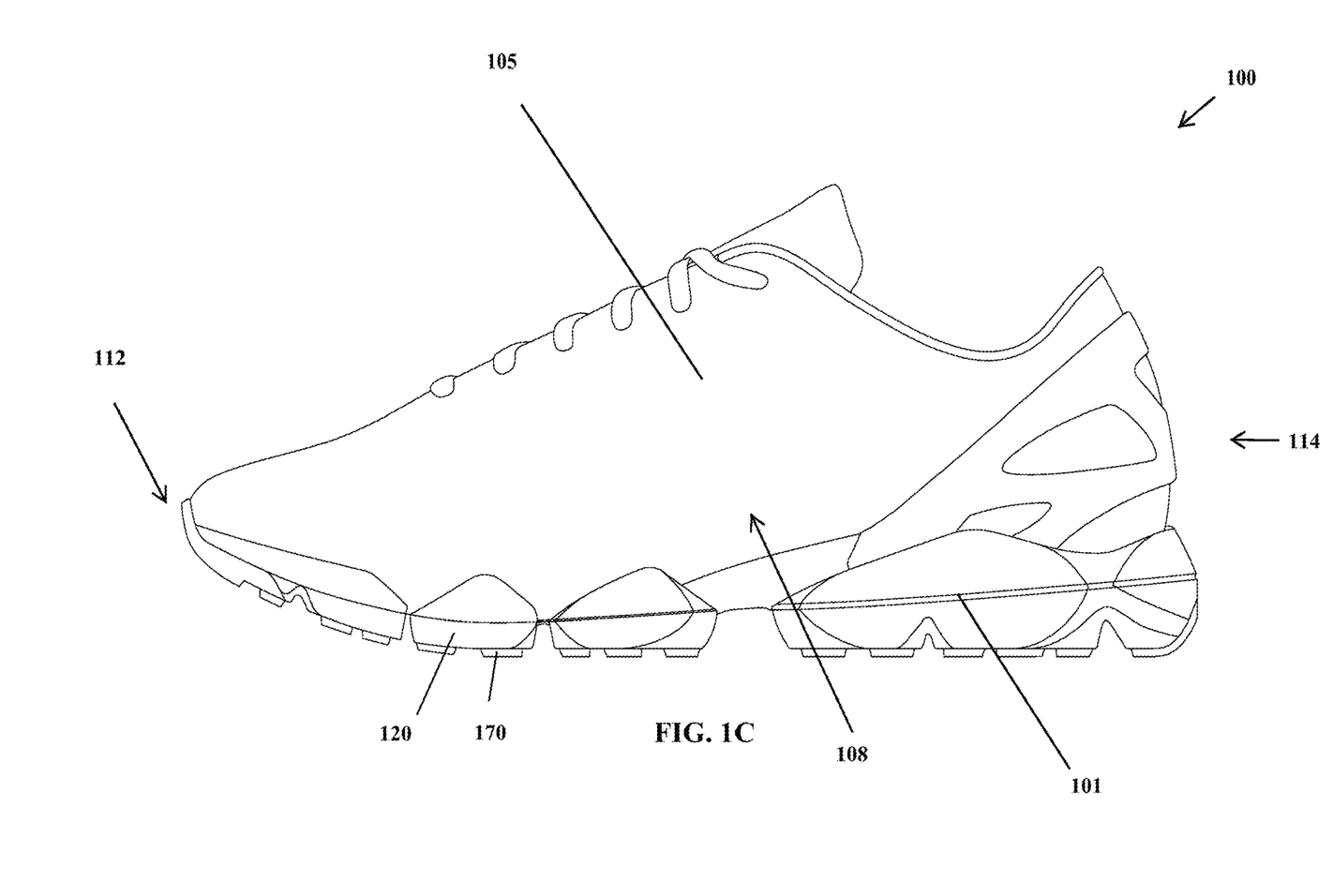
FIG. 1C is a side view in elevation of the article of footwear shown in FIG. 1A, showing the medial footwear side.

As described herein with reference to the figures, an article of footwear 100 with a lightweight outsole structure in accordance with the invention includes an upper 105 coupled to a sole structure 101 and further includes a heel counter 115 and a fastening element or fastener 180 (e.g., a lace or cord as shown in FIG. 1A). The article of footwear 100, also referred to herein as a shoe, can be in the form of a running shoe or other type of athletic shoe. The sole structure 101 includes a midsole structure, referred to generally in the figures as structure 120, and an outsole structure 170 as described herein that provide features of suitable cushioning and comfort as well as lightweight characteristics due at least in part to the very thin thickness of the outsole structure as described herein. The midsole structure 120 can include a plurality of different layers having different degrees of compressibility, flexibility and/or hardness in order to facilitate comfort and enhanced performance (e.g., maintaining a natural gait cycle by the user) of the shoe 100. However, it is noted that the outsole structure 170 can also be incorporated with any other types of sole structures, including midsole structures including any number of layers (e.g., one or more layers).

Referring to FIGS. 1A-1D, the article of footwear or shoe 100 includes a forefoot region 102 that generally aligns with the ball and toes of a user's foot (i.e., when a user is wearing the shoe), a midfoot region 104 that generally aligns with the arch and instep areas of the user's foot, and a hindfoot region 106 that generally aligns with the heel and ankle areas of the user's foot. The shoe 100 further includes a medial side 108 that is oriented along the medial or big toe side of the user's foot, a lateral side 110 that is oriented along the lateral or little toe side of the user's foot, a toe (i.e., front) end 112 that corresponds with the toe end of the user's foot and a heel (i.e., rear) end 114 that corresponds with the heel of the user's foot. The heel end 114 has a curved shape defining a heel cup that generally conforms with the user's heel and extends between the lateral and medial sides 108, 110 of the shoe 100. While the example embodiments of a shoe depicted in the figures show an article of footwear (shoe) configured for a right foot, it is noted that the same or similar features can also be provided for an article of footwear (shoe) configured for a left foot (where such features of the left footed shoe are reflection or "mirror image" symmetrical in relation to the right footed shoe).

The upper 105 defines an envelope or pocket that, when secured to a portion of the midsole structure 120, covers and protects the foot of the wearer. The upper 105 can be formed of any one or more materials suitable for its described purpose, including conventional materials (e.g., woven or nonwoven textiles, knit textiles, leather, synthetic leather, rubber, etc.). The specific materials utilized are generally selected to impart wear-resistance, flexibility, air-permeability, moisture control and/or comfort to the user wearing the shoe 100. Further, the upper 105 may possess any dimensions (size/shape) suitable for its described purpose. For example, the upper 105 may possess a "high top" configuration, in which a hindfoot region 106 of the upper extends over and/or above at least a portion of a user's ankle. Alternatively, the upper 105 may possess a "mid top" configuration (in which the upper extends to slightly below or at the user's ankle), a low top configuration, or any other suitable configuration. The upper 105 can be coupled to the midsole structure 120 in any suitable manner (e.g., via stitching, adhesion, molding, etc.). In an example embodiment, the upper 105 can be secured to a portion of the midsole structure 120 via a strobel member (not shown), e.g., by stitching a lower portion of the upper 105 to the strobel member and securing the strobel member to a portion of the midsole structure 120 (e.g., by stitching, adhesion, etc.).

The shoe 100 can also include a heel counter 115 having a generally curved configuration that corresponds with the shoe heel end 214 so as to surround a portion of the upper 105 at the heel end. In an embodiment, the heel counter 115 includes a central member mounted with a portion of the midsole structure 120 at a region corresponding with the hindfoot region 106 of the shoe 100 and extending distally (upward) from the midsole structure 120. A pair of arms extends from the distal portion of the heel counter central member. In particular, a first arm extends from the lateral portion of the central member and along the medial shoe side 108, while a second arm extends from the distal portion of the central member and along a lateral shoe side 110. The heel counter 115 provides external strengthening at this area of the shoe 100 (e.g., by controlling or stabilizing a user's heel inside the shoe to minimize excessive supination or pronation of the foot). The heel counter 115 can be formed of any one or more suitable materials including, without limitation, one or more thermoplastic elastomers such as EVA or TPU (thermoplastic polyurethane). The heel counter 115 can be coupled to the upper 105 in any suitable manner (e.g., via an adhesive, via welding, melt bonding, etc.).

The upper 105 can be formed in any suitable manner and utilizing any suitable number of parts or components that are combined in any suitable manner (e.g., via adhesion, molding, stitching, etc.). Further, the one or more components forming the upper can be formed in any suitable manner (e.g., via any one or combination of weaving, knitting and molding processes to form the one or more components).

As previously noted, the upper midsole structure 120 can comprises one or more layers formed of any selected types of materials that provide a suitable degree of cushioning, hardness and/or flexibility. For example, the one or more layers of the midsole structure can be formed of any suitable types of foam materials, such as an ethylene vinyl acetate (EVA) foam material, a polyurethane foam material, etc. In addition, the midsole structure can optionally include one or more layers comprising a harder material (e.g., a material having a Shore A hardness that is greater than a foam material, such as a flexible plate provided as part of the midsole structure.

Figure 1D:
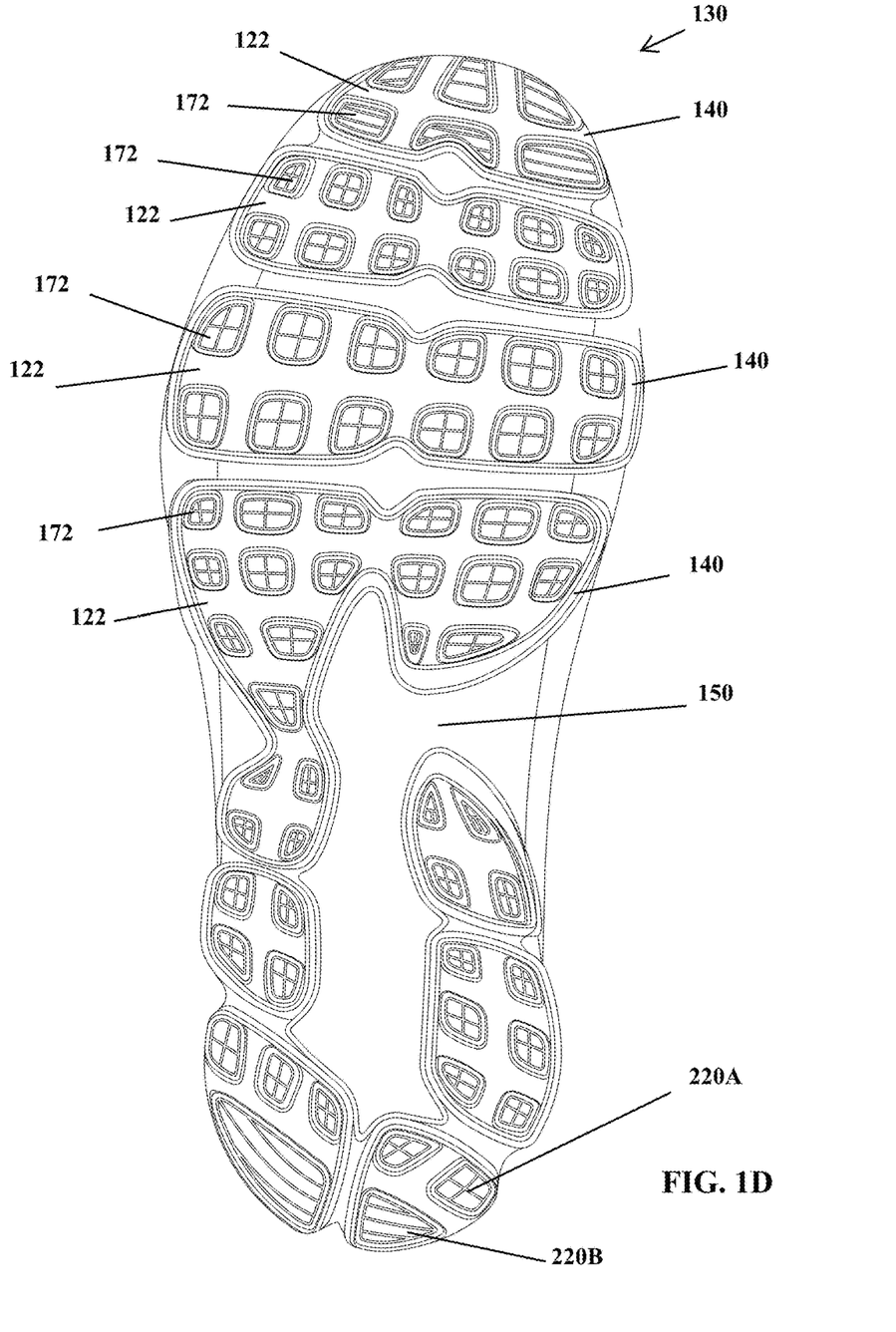
FIG. 1D is a bottom view in plan of the article of footwear of FIG. 1A.

Referring to FIG. 1D, a bottom side 130 of the sole structure (which also corresponds with the bottom side of the shoe 100) includes portions of the outsole structure 170 and portions of the midsole structure 120. In particular, the portions are separated to form individual sole structure elements or pods 140, and each pod 140 comprises a midsole structure portion 122 and an outsole structure portion 172. The separation or gap between pods 140 exposes portions of a flexible plate 150 provided as a layer of the midsole structure 120. The arrangement of the pods 140 provides suitable ground engaging structure for the shoe 100 while minimizing material required to form the midsole and outsole structures 120, 170. However, it is noted that the sole structure 101 at the bottom side 130 can include any other suitable configuration that implements the outsole structure 170 of the present invention. In other example embodiments, the outsole structure and/or midsole structure can extend the entire area of the sole structure bottom side 130. For example, the midsole structure can extend substantially entirely the footprint of the shoe at the sole structure bottom side, where the outsole structure can include separate portions that are spaced from each other along the sole structure bottom side (i.e., spacings or gaps are provided between outsole structure portions). In another example embodiment, the outsole structure can extend substantially entirely the footprint of the shoe at the sole structure bottom side (i.e., substantially covering the sole structure bottom side). As described herein, since the thickness of the outsole structure is significantly diminished in relation to conventional outsole structures, the outsole structure can be applied over some or all of the bottom side (i.e., the ground engaging side) of the sole structure for the shoe while still limiting overall weight of the shoe.

Figure 2A:
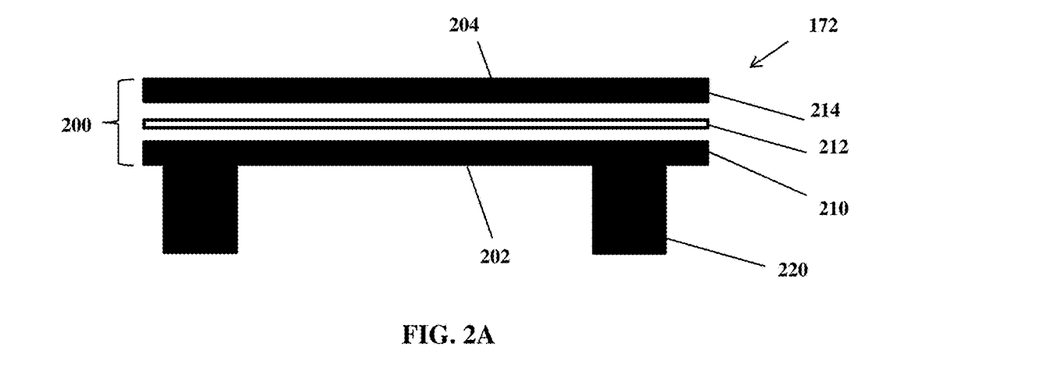
FIG. 2A is an exploded view of components for an example embodiment of a portion of an outsole structure formed in accordance with the present invention.
Figure 2B:
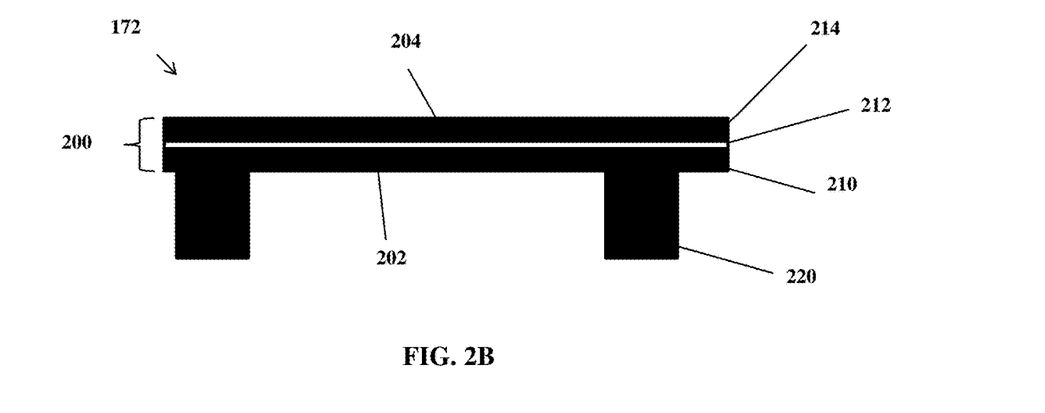
FIG. 2B is a view of the portion of the outsole structure of FIG. 2A assembled.

Referring to FIGS. 2A and 2B, each outsole structure portion 172 includes a base structure 200 and one or more ground engaging elements or lugs 220 extending from a ground-facing or bottom surface 202 of the base structure 200. The lugs 220 can have any suitable sizes and geometric configurations (e.g., generally rectangular or triangular configurations as depicted in the figures and/or any other geometric configurations) and can be spaced in any suitable patterns and alignments along the bottom surface 202 of the base structure 200 depending upon a particular application of use for the shoe 100. As depicted in FIG. 1D, the lugs 220 extend in generally linear rows oriented along the pods 320 in a direction transverse the lengthwise dimension of the bottom side 130, where each pod 140 includes a plurality or rows of lugs 220. However, any other patterns or arrangements of lugs 220 can also be provided, with different patterns or arrangements of lugs being provided at different portions of the shoe (e.g., at the forefoot region, midfoot region and hindfoot region).

The lugs 220 can further have any selected number and/or types of etches or depressions on one or more surfaces of the lugs. In the example embodiment depicted in FIG. 1D, certain lugs 220A include a first groove along the ground engaging surfaces of the lugs that extends in a direction that is in general correspondence with the lengthwise dimension of the bottom side 130 of the sole structure 101 and a second groove extending in a direction transverse so as to intersect with the first groove so as to form a cross-shaped ("+") groove pattern. Other lugs 220B include etches or grooves formed on ground engaging surfaces of the lugs 220B, where the grooves extend generally in parallel with each other and in a direction that is transverse the lengthwise dimension of the bottom side 130. In other embodiments, the lugs can have any other one or more types of configurations, shapes and/or patterns designed for a particular purpose or end use of the shoe.

The outsole structure 170 (e.g., including outsole structure portions 172) is harder and less compressible in relation to some or all of the midsole structure 120. For example, the outsole structure portions 172 can be harder (less compressible) in relation to the midsole structure portions 122, where the outsole structure portions 172 have a Shore A durometer greater than about 50. For example, the outsole structure 170 can be formed of materials including a suitable compressible material (e.g., rubber) having a Shore A durometer of approximately 60-80 (e.g., a Shore A durometer of about 65-70). The thickness of the outsole structure 170 is further much smaller in relation to the midsole structure 120. For example, the outsole structure 170 can have an overall or maximum thickness of no greater than about 4.0 mm, in particular an overall or thickness of no greater than about 3.0 mm. As described herein, the outsole structure is formed with a plurality of layers including at least one textile or fabric layer disposed between two rubber layers, where the thickness of the plurality of layers (excluding any ground engaging elements or lugs extending from a lowermost rubber layer of the plurality of layers) can have a thickness of no greater than about 2.0 mm or even about 1.5 mm, and further still no greater than about 1.2 mm.

Referring again to FIGS. 2A and 2B, the outsole structure 170 (e.g., at each outsole structure portion 172) comprises the base structure 200 and lugs 220 extending from the bottom surface 202 of the base structure 200. The base structure 200 comprises a first or lower layer 210 including the bottom surface 202, a second or intermediate layer 212 connected with the first layer 210, and a third or upper layer 214 that defines an upper surface 204 of the base structure 200. Thus, the base structure 200 includes a plurality of layers 210, 212, 214 arranged in a stacked alignment with each other (i.e., vertically stacked alignment when integrated into the sole structure 101 of the shoe 100). While the base structure is depicted as including three layers, other base structures can also be formed in accordance with the invention that include any selected number of layers (e.g., more than three layers).

The base structure 200 (which includes the first, second and third layers) can have a thickness that is less than the thickness of the lugs 220. For example, the base structure 200 can have an overall or maximum thickness of no greater than about 2.0 mm, such as no greater than about 1.5 mm or no greater than about 1.2 mm. In particular, the base structure 200 can have a thickness ranging from about 0.6 mm to about 1.2 mm (e.g., about 0.7 mm to about 0.8 mm), while lugs 220 can have thicknesses in the range of at least about 1.5 mm, such as about 1.8 mm to about 2.2 mm (e.g., about 2.0 mm). The thickness of the base structure 200 can also vary as described herein, having a smaller thickness (e.g., about 0.7 mm) along the bottom surface 130 of the sole structure 101 and a slightly greater thickness (e.g., about 1.2 mm) at locations at which the base structure 200 curves slightly upward beyond peripheral edge portions of the bottom surface 130 (e.g., at a toe end and/or heel end of the shoe).

The first and third layers 210, 214 and the lugs 220 can be formed of the same material or different materials having sufficient flexibility and abrasion resistance based upon a particular purpose for the shoe. For example, each of the first and third layers 210, 214 and the lugs 220 can be formed of a suitable rubber material that is flexible but also provides desired traction (e.g., coefficient of friction), wear-resistance, and durability. Examples of suitable materials for the first and third layers 210, 214 of the base structure 200 and the lugs 220 are elastomers, siloxanes, natural rubber, and synthetic rubber (e.g., a block co-polymer of styrene-butadiene-styrene). In an example embodiment, the first and third layers 210, 214 and the lugs 220 are formed of a rubber material having a Shore A durometer greater than about 50, such as a Shore A durometer of about 65-70 (e.g., a Shore A durometer of 65±3). The rubber material forming the first and third layers 210, 214 and the lugs 220 can also have a high abrasion resistance. In particular, the rubber material can have an abrasion resistance of no greater than about 60 mm$^3$ as measured utilizing a DIN abrasion tester. An example embodiment of a rubber material suitable for use in forming one or both of the layers 210, 214 and/or the lugs 220 is a rubber material having a Shore A hardness of about 65 (e.g., a Shore A durometer of 65±3), a density of about 1.15 g/cm$^3$ (e.g., a density of 1.15±0.5 g/cm$^3$), a DIN abrasion resistance of no greater than about 60 mm$^3$, an Akron abrasion resistance (as measured by an Akron abrasion tester) of no greater than about 0.15, a tensile strength of at least about 120 kg/cm$^2$, an elongation of at least about 400%, and a tear strength of at least about 12 kg/cm.

The first layer 210 and the lugs 220 can be formed from a single, integral component or blank as described herein. Alternatively, the first layer 210 and lugs 220 can be formed from separate components and coupled together via any suitable process (e.g., adhesive bonding, melt bonding, etc.).

The second layer 212 of the base structure 200 comprises a different material than the first and third layers 210, 214 and has a hardness (e.g., measured as a Shore A durometer value) that is less than the hardness of each of the first and third layers. The second layer 212 comprises a flexible textile (e.g., fabric) or other suitably lightweight material that reinforces the thin base structure 200. In an example embodiment, the second layer 212 can be any suitable textile layer (also referred to herein as a fabric layer), such as a web (e.g., a nonwoven web) of fabric mesh or scrim material, where the fabric layer can be formed from any one or more of the following materials: polyurethanes, polyesters (e.g., polyethylene terephthalate), polyolefins (e.g., polyethylene and polypropylene), polyamides (e.g., aliphatic or aromatic polyamide materials, such as nylon), elastomers, carbon fibers, cotton, and any one or more combinations and/or copolymers thereof. In example embodiments, the textile or fabric material forming the second layer 212 comprises one or more components selected from the group consisting of nylon, polyester and cotton. In other example embodiments, the textile or fabric material comprising the second layer 212 can comprise a two or four way stretch elastomer material, such as a polyester-polyurethane copolymer commercially available under tradenames such as Spandex, Lycra or elastane.

The textile/fabric layer can comprise a mesh layer. In particular, the textile layer can comprise a mesh material that includes a plurality of apertures or holes through the textile/fabric layer, where the mesh size (i.e., size of apertures) and mesh density (number of apertures per unit area) can be configured as desired (e.g., for a particular basis weight of the mesh fabric). In an example embodiment, the textile/fabric layer can include a suitable mesh size and mesh density to have a weight of about 3-5 ounces per square yard.

The textile or fabric can be formed via and suitable types of natural and/or synthetic fibers, filaments or yarns that can be formed via any suitable method(s) (e.g., woven, nonwoven, knitted, etc.). The weight of the textile second layer can be about 3 ounces per square yard (oz/yd$^2$) (about 102 grams per square meter (g/m$^2$)) to about 5 oz/yd$^2$ (about 170 g/m$^2$), such as about 4 oz/yd$^2$ (about 136 g/m$^2$). The textile second layer can be configured to provide a very thin reinforcement or scrim layer within the outsole structure to enable the formation of the outsole structure having a reduced thickness while maintaining sufficient strength and a reduced weight.

The first and third layers 210, 214 have a greater thickness than the second layer 212 (e.g., as much as about 2-4 times greater in thickness) and thus comprise a majority of the overall thickness of the base structure 1010. For example, each of the first and third layers 1012, 1016 can have a thickness in the range of about 0.3 mm to about 0.4 mm, with the second layer 1014 having a thickness of no greater than about 0.2 mm (e.g., no greater than about 0.1 mm). The first and third layers 210, 214 can further have the same or a substantially similar thickness or, alternatively, different thicknesses. In embodiments in which the thickness of the base structure 200 changes at different locations of the sole structure 101, the second layer 212 can vary in its position within the overall base structure 200 (e.g., due to changes in thickness in either or both of layers 210, 214).

An outsole structure 170 having a configuration as described herein can be designed to be lighter (i.e., more lightweight) and having a significantly decreased thickness in relation to other (e.g., conventional) outsole structures provided for other shoes. For example, conventional rubber outsoles typically have a webbing or base material thickness (i.e., a thickness not including the lugs) of about 1.5 mm to about 2 mm. Such conventional rubber outsoles can further be heavy and provide minimal flexibility in order to enhance the durability of the shoe (i.e., reduce wear at the bottom of the shoe). In contrast, the outsole structure 170 as described herein has a reduced thickness of the base structure 200 in relation to conventional rubber outsoles and is also lighter in weight and more flexible while maintaining similar wear/abrasion resistance characteristics as such heavier conventional rubber outsoles. For example, a base structure 200 for the outsole structure 170 that is formed utilizing materials as described herein and having a thickness (including the first, second and third layers) of no greater than about 0.8 mm can have a weight reduction of at least about 33% in relation to a rubber outsole structure having a conventional thickness of about 1.2 mm, a weight reduction of at least about 47% in relation to a rubber outsole structure having a conventional thickness of about 1.5 mm, and a weight reduction of at least about 60% in relation to a rubber outsole structure having a conventional thickness of about 2.0 mm.

The outsole structure 170 can be formed in any suitable manner that effectively combines and secures the layers of the base structure together. An example compression molding process for forming any portion of the outsole structure (e.g., outsole portions 172) is described with reference to the flow chart of FIG. 3. At step 310, a rubber blank (used to form layer 214) is initially pressed (e.g., via a calendar press roll or by any other suitable pressing device) to a desired thickness (e.g., about 0.4 mm). At step 312, a web of mesh fabric material is heat pressed at a suitable temperature (e.g., no greater than about 180° C., such as a temperature in the range of about 155° C. to about 160° C.) and suitable pressure (e.g., about 150 kg/cm$^2$ to about 160 kg/cm$^2$) for a suitable time period (e.g., about 3 minutes to about 10 minutes, such as from about 4.5 minutes to about 5 minutes) against layer 214 in a mold press to cure the rubber and secure the two layers 212, 214 together. At step 314, a second blank (used to form layer 210) is also pressed (e.g., via a calendar press roll or by any other suitable pressing device) to a desired thickness. At step 316, the second blank is placed into a mold that includes indentations to form lugs (at the surface 202 of the blank/layer 210) and is heat pressed and cured within the mold at a suitable temperature (e.g., no greater than about 180° C., such as a temperature in the range of about 155° C. to about 160° C.) and a suitable pressure (e.g., about 150 kg/cm$^2$ to about 160 kg/cm$^2$) for a suitable time period (e.g., about 1 minute to about 10 minutes, such as from about 4.5 minutes to about 5 minutes, or about 1-2 minutes) to cure the rubber and form the lugs on surface 202. At step 318, the two layer structure (layers 212, 214) is placed against the upper surface of the layer 210 (with fabric layer located between layers 212, 214), and at step 320 the two layer structure is heat pressed/cured to the third layer (e.g., in the same mold used for the processing at step 316) at a suitable temperature (e.g., no greater than about 180° C., such as a temperature in the range of about 155° C. to about 160° C.) and a suitable pressure (e.g., about 150 kg/cm$^2$ to about 160 kg/cm$^2$) for a suitable time period (about 3 minutes to about 10 minutes, such as from about 4 minutes to about 8 minutes, or from about 4.5 minutes to about 5 minutes) to cure the rubber and secure the two layer structure to the third layer. The process results in formation of the thin web rubber outsole structure including two rubber layers (layers 210, 214) and a mesh web of fabric layer (layer 212) disposed between the two rubber layers (e.g., a base structure 200 as depicted in FIG. 2B), where one layer (layer 210) includes lugs extending from its surface (lugs 220). As previously noted, the rubber layers can have a thickness of about 0.4 mm or less and the web of mesh fabric layer can be about 0.1-0.2 mm or less, resulting in the base structure 200 having an overall thickness that is about 1.0 mm or less. The lugs 220 can further have a thickness that is much larger than the base structure 200 (e.g., the lugs can have a thickness as large as about 2.0 mm or even larger).

Figure 3:
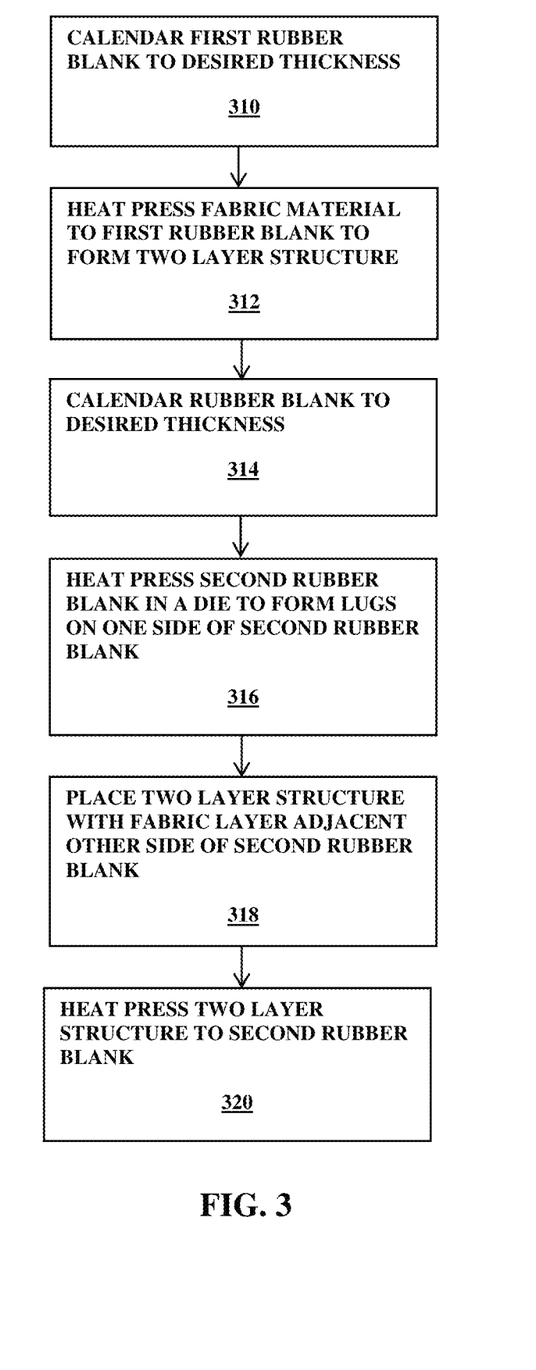
FIG. 3 is a flowchart illustrating example method steps in accordance with the present invention for forming the outsole structure of FIGS. 2A and 2B.

The outsole structure elements 172 can be cut and/or pressed out of the three layered structure by the process depicted in FIG. 3. In particular, outsole structure elements 172 can be formed having the shapes and configurations as desired (e.g., as depicted in FIG. 1D for the sole structure bottom side 130). The outsole structure elements can then be secured to the midsole structure 120 (e.g., midsole structure portions 122) in any suitable manner (e.g., via adhesion, heat welding, etc.).

The addition of the textile or fabric layer between the two rubber layers significantly increases the tear resistance of the overall three-layered base structure 200 to prevent ripping or tearing of the base structure 200 during molding and de-molding process steps (e.g., removal of the layered structure from a mold press) at such low thicknesses (e.g., thicknesses no greater than about 1.2 mm).

Figure 4:
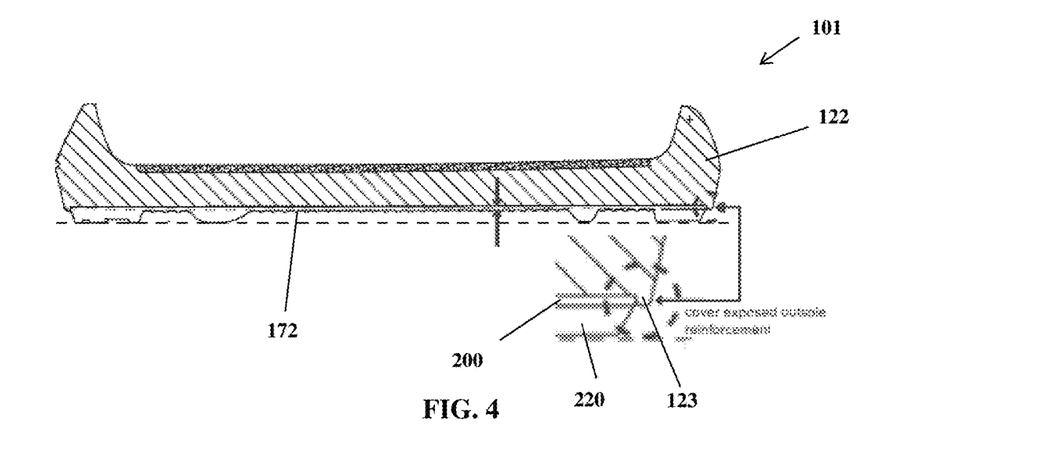
FIG. 4 is a cross-sectional view of a portion of a sole structure for the article of footwear of FIG. 1A illustrating a connection between the outsole structure of FIGS. 2A and 2B with a midsole portion of the sole structure.

In example embodiments, the outsole structure 170 (e.g., outsole structure portions 172) can be secured partially within one or more indentations defined along the bottom or ground facing surface of the midsole structure 120 (e.g., midsole structure portions 122). For example, the indentations along the surface of the midsole structure 120 can be sufficiently dimensioned such that some or all of the base structure 200, including at least layers 212, 214, is secured within an indentation. This can help to further secure the outsole structure to the bottom of the midsole structure. In addition, such a configuration can also serve to provide a cover by the midsole structure over the peripheral sides of part of the outsole structure so as to prevent exposure of the intermediate/fabric layer 212 of the outsole structure 170. For example, as depicted in a cross-sectional view of the sole structure 101 in FIG. 4, an outsole structure portion 172 is partially secured within an indentation at the bottom surface of a midsole structure 122 such that at least layers 214 and 212 of the base structure 200 are within the indentation and thus covered at the peripheral sides of the base structure 200 by material 123 of the midsole structure portion 122.

Figure 5:
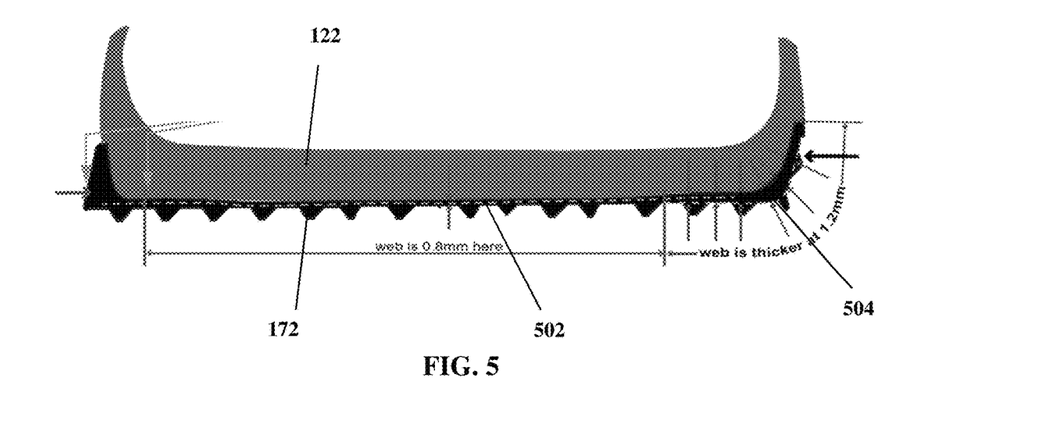
FIG. 5 is another cross-sectional view of a portion of a sole structure for the article of footwear of FIG. 1A illustrating a connection between the outsole structure of FIGS. 2A and 2B with a midsole portion of the sole structure.

As previously noted, the thickness of the outsole structure 170 (e.g., the thickness of the base structure 200) can vary along one or more dimensions of the sole structure bottom side 130. For example, as depicted in FIG. 5, the outsole structure can have a first thickness (e.g., about 0.8 mm) at a generally central location of the bottom side 130 (e.g., at location 502) and a second thickness that is greater than the first thickness (e.g., a second thickness of about 1.2 mm) at a peripheral side location of the bottom side 130 (e.g., at location 504). The thicker portions of the base structure 200 can be provided at certain locations (e.g., at or near the peripheral sidewall portions of the shoe) where reinforcement of the outsole structure may be desired for particular applications.

Broadly stated, the outsole may be a laminate including a first elastomer layer disposed over a reinforcing layer and a second elastomer layer disposed under the reinforcing layer. The first elastomer layer may be generally planar, and is mounted onto the second layer of reinforcing material. The reinforcing layer can be a textile layer, e.g., an open web fabric. In an embodiment, the textile layer is a woven mesh. The second elastomer layer is nonplanar, including lugs integrally formed therein (e.g., the lugs form a unitary construction with the second elastomer layer). In an embodiment, the elastomer is rubber that is simultaneously applied in a molten state to both sides of the reinforcing layer, and then cooled and/or cured. The addition of the textile or fabric layer between the two rubber layers significantly increases the tear resistance of the overall three-layered base structure to prevent ripping or tearing of the base structure during molding and de-molding process steps. In addition, the resulting structure provides an outsole that is thinner than conventional outsoles, while being highly durable.

While the invention has been described in detail and with reference to specific embodiments thereof, it will be apparent to one skilled in the art that various changes and modifications can be made therein without departing from the spirit and scope thereof.

For example, the outsole structure can include any suitable number of layers (e.g., more than three layers). In one example embodiment, an outsole structure can include a base structure comprising layers such as rubber layer/textile layer/rubber layer/textile layer/rubber layer. While additional layers provided for the outsole structure can increase the overall thickness, each layer can still have a sufficiently small thickness (e.g., no greater than about 4 mm, or even no greater than about 2 mm) such that the overall thickness is still less than conventional outsole structures for shoes. The textile or fabric layer(s) provided within the outsole structure significantly increases the tear strength such that such small thickness and lightweight outsole structures can be formed that still exhibit suitable abrasion/wear resistant characteristics.

Thus, it is intended that the present invention covers the modifications and variations of this invention provided they come within the scope of the appended claims and their equivalents. It is to be understood that terms such as "top", "bottom", "front", "rear", "side", "height", "length", "width", "upper", "lower", "interior", "exterior", and the like as may be used herein, merely describe points of reference and do not limit the present invention to any particular orientation or configuration.

What is claimed:

1. An article of footwear comprising:
an upper; and
a sole structure, the sole structure comprising:
an outsole structure comprising a plurality of layers, the plurality of layers including an upper rubber layer, a lower rubber layer and a textile layer disposed between the upper and lower rubber layers, wherein:
the textile layer is formed from a material selected from the group consisting of a polymer material, a cotton material and combinations thereof,
a plurality of ground-engaging structures extend from a lower surface of the lower rubber layer,
the lower rubber layer extends continuously with the textile layer such that no portion of the textile layer is exposed along a ground-engaging side of the outsole structure,
the upper rubber layer extends continuously with the textile layer such that no portion of the textile layer is exposed through the upper rubber layer, and a combined thickness of the plurality of layers including the upper rubber layer, the lower rubber layer and the textile layer is no greater than about 2.0 mm; and a midsole structure connected between the upper and the outsole structure such that the outsole structure is separated from the upper.

2. The article of footwear of claim 1, wherein the textile layer comprises a material selected from the group consisting of a polyurethane, a polyester, a polyolefin, a polyamide, an elastomer, cotton, and any one or more combinations and/or copolymers thereof.

3. The article of footwear of claim 1, wherein the textile layer comprises a woven or knitted fabric.

4. The article of footwear of claim 1, wherein each of the upper and lower rubber layers has a Shore A durometer of greater than about 50.

5. The article of footwear of claim 1, wherein each of the upper and lower rubber layers has a Shore A durometer of about 65 to about 70.

6. The article of footwear of claim 1, further comprising a base structure including the plurality of layers and the plurality of ground engaging structures extending from the lower surface of the lower rubber layer.

7. The article of footwear of claim 6, wherein the base structure has a maximum thickness no greater than about 2.0 mm.

8. The article of footwear of claim 6, wherein the base structure has a maximum thickness no greater than about 1.2 mm.

9. The article of footwear of claim 6, wherein each of the upper and lower rubber layers includes a portion having a thickness no greater than about 0.4 mm.

10. The article of footwear of claim 9, wherein at least one rubber layer varies in thickness along one or more dimensions of the rubber layer.

11. The article of footwear of claim 6, wherein the textile layer has a thickness no greater than about 0.2 mm.

12. The article of footwear of claim 6, wherein at least one ground engaging element has a thickness that is greater than the thickness of the base structure.

13. The article of footwear of claim 12, wherein at least one ground engaging element has a thickness of at least about 1.5 mm.

14. The article of footwear of claim 1, further comprising an upper connected with a sole structure, and the sole structure comprises the outsole structure.

15. The article of footwear of claim 1, wherein the midsole structure includes a layer that is coupled with a portion of the outsole structure at a surface that opposes the lower surface of the lower rubber layer.

16. The article of footwear of claim 15, wherein the midsole structure layer includes at least one indentation dimensioned to receive and retain a portion of the outsole structure that includes the textile layer.

17. The article of footwear of claim 1, wherein the textile layer is disposed adjacent a surface of the upper rubber layer or the lower rubber layer.

18. The article of footwear of claim 1, wherein the textile layer is disposed adjacent a surface of each of the upper rubber layer and the lower rubber layer.

19. A method of forming the outsole structure for the article of footwear of claim 1, the method comprising:

pressing a an upper surface of the textile layer against the upper rubber layer in a mold that secures the textile and upper rubber layers together;

pressing the lower rubber layer in a mold to form ground engaging structures extending from the lower surface of the lower rubber layer;

placing the textile and upper rubber layers secured together against the lower rubber layer such that a lower surface of the textile layer is adjacent an upper surface of the lower rubber layer; and pressing the lower, textile and upper layers together in a mold to secure the textile layer to the lower rubber layer.

20. An article of footwear comprising:

an upper; and a sole structure, the sole structure comprising:

an outsole structure comprising a plurality of layers, the plurality of layers including an upper rubber layer, a lower rubber layer and a textile layer disposed between and adjacent to each of the upper and lower rubber layers, wherein:

the upper and lower rubber layers are formed of the same rubber material, the textile layer is formed from a material selected from the group consisting of a polymer material, a cotton material and combinations thereof, a plurality of ground-engaging structures extend from a lower surface of the lower rubber layer, the lower rubber layer extends continuously with the textile layer such that no portion of the textile layer is exposed along a ground-engaging side of the outsole structure, an exterior surface of the lower rubber layer defines at least part of the ground-engaging side of the outsole structure, and a combined thickness of the plurality of layers including the upper rubber layer, the lower rubber layer and the textile layer is no greater than about 2.0 mm; and a midsole structure connected between the upper and the outsole structure such that the outsole structure is separated from the upper.

\* \* \* \* \*